(12) United States Patent
Gebhard et al.

(10) Patent No.: US 8,691,907 B2
(45) Date of Patent: Apr. 8, 2014

(54) WATER-BORNE PRIMER

(75) Inventors: Matthew S. Gebhard, Best (NL); Cynthia Baricos, Chicago, IL (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 13/302,415

(22) Filed: Nov. 22, 2011

(65) Prior Publication Data

US 2012/0136105 A1 May 31, 2012

Related U.S. Application Data

(60) Provisional application No. 61/416,609, filed on Nov. 23, 2010.

(51) Int. Cl.
| | | |
|---|---|---|
| C08K 3/34 | (2006.01) | |
| C08L 33/04 | (2006.01) | |
| C08K 3/36 | (2006.01) | |
| C08L 25/06 | (2006.01) | |
| C08K 3/08 | (2006.01) | |
| C09D 5/00 | (2006.01) | |
| C08L 67/08 | (2006.01) | |
| C08K 3/26 | (2006.01) | |

(52) U.S. Cl.
CPC .............. C09D 5/002 (2013.01); C08L 67/08 (2013.01); C08K 3/26 (2013.01)
USPC ........... 524/451; 524/444; 524/449; 524/413; 528/295.5

(58) Field of Classification Search
USPC ................. 524/444, 449, 451, 454, 601, 604; 528/295.5
See application file for complete search history.

(56) References Cited

U.S. PATENT DOCUMENTS

| | | | |
|---|---|---|---|
| 4,008,202 A | 2/1977 | Evani et al. | |
| 4,079,028 A | 3/1978 | Emmons et al. | |
| 4,155,892 A | 5/1979 | Emmons et al. | |
| 4,288,639 A | 9/1981 | Camp | |
| 4,354,956 A | 10/1982 | Camp | |
| 4,384,096 A | 5/1983 | Sonnabend | |
| 4,421,902 A | 12/1983 | Chang et al. | |
| 4,423,199 A | 12/1983 | Chang et al. | |
| 4,425,469 A | 1/1984 | Emmons et al. | |
| 4,426,485 A | 1/1984 | Hoy et al. | |
| 4,429,097 A | 1/1984 | Chang et al. | |
| 4,432,881 A | 2/1984 | Evani | |
| 4,463,151 A | 7/1984 | Schultz et al. | |
| 4,463,152 A | 7/1984 | Schultz et al. | |
| 4,496,708 A | 1/1985 | Dehm et al. | |
| 4,499,233 A | 2/1985 | Tetenbaum et al. | |
| 4,514,552 A | 4/1985 | Shay et al. | |
| 4,663,385 A | 5/1987 | Chang et al. | |
| 4,722,962 A | 2/1988 | Shay et al. | |
| 4,904,466 A | 2/1990 | Carson et al. | |
| 5,023,309 A | 6/1991 | Kruse et al. | |
| 5,281,654 A | 1/1994 | Eisenhart et al. | |
| 5,342,883 A | 8/1994 | Jenkins et al. | |
| 5,454,801 A * | 10/1995 | Lauritzen | 604/378 |
| 5,759,705 A * | 6/1998 | Sinko | 428/537.1 |
| 6,113,989 A * | 9/2000 | Sinko | 427/408 |
| 6,344,500 B1 * | 2/2002 | Ogawa et al. | 523/407 |
| 6,348,536 B1 | 2/2002 | Fourty et al. | |
| 6,533,856 B1 | 3/2003 | Hodges et al. | |
| 2009/0004468 A1 * | 1/2009 | Chen et al. | 428/351 |
| 2009/0088516 A1 * | 4/2009 | Li et al. | 524/502 |
| 2010/0069536 A1 * | 3/2010 | Sau | 524/48 |

FOREIGN PATENT DOCUMENTS

| | | |
|---|---|---|
| WO | 96/40185 | 12/1996 |
| WO | 96/40625 | 12/1996 |
| WO | 96/40820 | 12/1996 |
| WO | WO 2011053904 A1 * | 5/2011 |

OTHER PUBLICATIONS

Elementis (Bentone EW. Rheox, Inc., 2012).*
Dow (Acrysol RM-2020, Dec. 2007, 4 pages).*
Hoffmann Mineral (Structure and effects of functional fillers, Neuberg, 2007, 25 pages).*
Talbert (Paint Technology Handbook: 2.3 Extenders. CRC Press, 2008. pp. 66-68).*
USGS (Some Facts About Asbestos. Mar. 2001, 4 pages).*

* cited by examiner

Primary Examiner — Ling Choi
Assistant Examiner — Brieann R Fink
(74) Attorney, Agent, or Firm — Kagan Binder, PLLC

(57) ABSTRACT

A water-borne stain blocking primer comprises a) from about 10 to about 30 wt % of a water-dispersible, hydrophobic alkyd resin having an acid number of less, than 40 KOH/g, b) from about 5 to about 30 wt % of a pigment, the pigment having an average aspect ratio of at least 3:3:1; c) from about 0.05 to about 3 wt % of a tannin chelation agent; d) from about 0 to about 20 wt % of a water-dispersible, hydrophobic free-radically polymerized copolymer; e) a hydrophobically modified associative rheology modifier in an amount effective to provide a water-borne primer having an ICI viscosity of from about 0.5 to about 3.0 poise; and a KU viscosity range of from about 80 to about 120 Krebs units; and f) water. The water-borne primer has a VOC content of less than 5%. Methods of preparing and using such water-borne stain blocking primers also are described.

20 Claims, No Drawings

WATER-BORNE PRIMER

REFERENCE TO RELATED APPLICATIONS

This application claims the benefit of priority under 35 U.S.C. 119(e)(1) of a provisional patent application Ser. No. 61/416,609, filed Nov. 23, 2010, which is incorporated herein by reference in its entirety.

FIELD OF THE INVENTION

The present invention relates to water-borne primers. More specifically, the present invention relates to water-borne stain blocking primer compositions.

BACKGROUND OF THE INVENTION

Primer compositions are typically applied to substrates in order to provide a uniform color base to a substrate, for subsequent application of coatings to provide a desired visual effect. Substrates may have initial color variances due to the presence of stains or color differences in substrate materials, such as the color of unprimed drywall as compared to taped joints. Additionally, prior marking of the substrate, e.g. by pencil, pen, permanent marker and the like may provide particular priming challenges because the prior marks may be visually apparent when covered by an ineffective primer. Certain marks or stains may be particularly challenging, because the mark or stain may migrate from the substrate through the primer, so that the mark or stain is apparent on the surface of the primed substrate only after passage of some time. Migration of stains to the surface of coatings from the substrate is particularly a problem when the coatings are water-based, and the marking or stain comprises water-soluble materials. This is especially acute in the case of aqueous white coatings. Such staining is particularly a problem in coatings applied on woods such as red cedar or redwood, noted for its high water-soluble tannin content, or previously painted surfaces that have been marked with a water soluble marker.

Various treatments and coatings have been developed in an attempt to provide stain blocking characteristics. Typically, such coatings utilize the organic solvent nature of oil-based coatings. However, it is extremely desirable to find a water-based solution in the effort to reduce the emission of Volatile Organic Compounds ("VOCs"). To this end, a number of approaches for blocking of stains, and in particular tannin migration, using water-borne systems have been proposed.

There is a need in the art for a water-based approach for effective blocking of stains, and in particular tannin migration and water soluble marker stains, in a coating system having low VOC emissions.

SUMMARY OF THE INVENTION

The technical challenges in providing effective products in general that meet low VOC criteria are daunting. Primers that are reasonably effective in blocking stains have been prepared in solvent based systems, but preparing such a system in a water based system is not a simple conversion of existing formulations.

The primer as provided herein affords exceptional stain blocking properties in a low VOC formulation. This new water-borne primer system achieves results comparable to high VOC solvent-borne products, thereby eliminating the need for such prior art systems.

A water-borne stain blocking primer comprises
a) from about 10 to about 30 wt % based on total solids content of the primer of a water-dispersible, hydrophobic alkyd resin having an acid number of less than 40 KOH/g;
b) from about 5 to about 30 wt % of a pigment based on total solids content of the primer, the pigment having an average aspect ratio of at least 3:3:1;
c) from about 0.05 to about 3 wt % of a tannin chelation agent based on total solids content of the primer;
d) from about 0 to about 20 wt % of a water-dispersible, hydrophobic free-radically polymerized copolymer;
e) a hydrophobically modified associative rheology modifier in an amount effective to provide a water-borne primer having an ICI viscosity of from about 0.5 to about 3.0 poise; and a KU viscosity range of from about 80 to about 120 Krebs units; and
f) water.

The water borne stain blocking primer of this invention contains less than 5% VOC by weight based on the total weight of the water borne stain blocking primer; preferably the water borne stain blocking primer contains less than 3% VOC by weight based on the total weight of the water borne stain blocking primer; more preferably the water borne stain blocking primer contains less than 2% VOC by weight based on the total weight of the water borne stain blocking primer.

A volatile organic compound ("VOC") is defined herein as a carbon containing compound that has a boiling point below 280° C. at atmospheric pressure. Compounds such as water and ammonia are excluded from VOCs.

It has been found that by careful selection of suitable alkyd resins in combination with the described pigments, and tannin chelation agents, and by addition of only so much hydrophobically modified associative rheology modifier as is required to obtain the desired ICI viscosity, a water-borne primer that provides surprisingly effective blockage of stains may be provided in a low VOC formulation.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

For purposes of the present invention, a water-borne primer is a primer composition wherein water is the major liquid carrier of the composition.

"ICI viscosity" is the viscosity, expressed in units of poise, measured on a high shear rate, cone and plate viscometer known as an ICI viscometer. An ICI viscometer is described in ASTM D4287. It measures the viscosity of a paint at approximately 10,000 sec$^{-1}$. ICI viscosities of primers were measured at a temperature of 25+/−0.3° C.

"KU viscosity" is the viscosity, expressed in Krebs units, measured on a Stormer-type viscometer in accordance with ASTM D562-10. The KU viscosities were measured at a temperature of 25+/−0.2° C.

The water-borne stain blocking primer as described herein comprises as a first component from about 10 to about 30 wt % based on total solids content of the primer of a water-dispersible, hydrophobic alkyd resin having an acid number of less than 40 KOH/g. In an embodiment of the present invention, the alkyd resin is present as from about 13 to about 25 wt % based on total solids content of the primer.

In an embodiment, the alkyd resin is hydrophobic alkyd resin having an acid number of less than 20 KOH/g. In a preferred embodiment, the alkyd resin exhibits a change in acid number of no more than 10 acid units after 30 days at 130° F.

In an embodiment, the alkyd resin is a medium oil alkyd. Mixtures of one or more alkyd resins are specifically contemplated.

Preferably, the alkyd resin is provided during manufacture of the primer in the form of a dispersed polymer having an initial solids content of from about 35 to about 65 wt %. Examples of a typical alkyd resin would include Synaqua™ AD 821-1391 from Cook Composites and Polymers Co.

In an embodiment of the present invention, the alkyd resin comprises drying alkyd resins. When drying resins are present, the composition of the present invention preferably additionally comprises metal driers to effect cure of the system when coated on the intended substrate. Examples of preferred metal driers comprise cobalt, manganese, barium, zirconium, calcium and iron based driers. In an embodiment the iron based drier, Borchi® OXY-Coat, is contemplated.

The water-borne stain blocking primer additionally comprises a pigment having a platelet morphology ("platelet-shaped pigment"), the platelet-shaped pigment being present in an amount of from about 5 to about 30 wt % of based on total solids content of the primer. For purposes of the present invention, a pigment having a platelet morphology has an average aspect ratio of the X:Y:Z dimensions of at least about 3:3:1. While not being bound by theory, it is believed that the coating provided by the present primer exhibits superior stain blocking power at least in part because the migration of tannins and other stain-causing components to the surface of the coating is reduced due to the tortuous pathway imparted to the coating by the platelet-shaped pigment. In an embodiment, the platelet-shaped pigment has an average aspect ratio greater than 3:4:1, or greater than 4:4:1. In another embodiment, the platelet-shaped pigment has a Median Particle Size in its longest dimension of from about 2 to about 20 microns.

Embodiments of suitable platelet-shaped pigments are selected from talc, clay, or mica. Mixtures of one or more platelet-shaped pigments are specifically contemplated. Talc in particular is a preferred platelet-shaped pigment. In certain preferred embodiments a mixture of platelet talc, clay, and/or mica is desirable.

The primer of the present invention optionally additionally comprises one or more pigments having an aspect ratio less than 3:3:1 ("low aspect ratio pigments"). Low aspect ratio pigments may be selected from any appropriate pigment material, such as talc, clay, nepheline syenite, titanium dioxide, zinc oxide, calcium carbonate, silica, silica-alumina, alumina, hollow particles, magnesium silicate, and the like. Hollow particles, organic opaque materials, or other pigment substitutes may, also be used. Carbon black, activated carbon, or other carbon forms may be used. Mixtures of one or more low aspect ratio pigments are specifically contemplated. Preferred low aspect ratio pigments are selected from titanium dioxide, zinc oxide, silica, silica-alumina and clay.

In an embodiment of the present invention, the pigment size and aspect ratios are determined by inspection of scanning electron microscope images, photomicrographs or other magnified images. In an embodiment, the pigment is provided in a size distribution wherein at least about one half of the volume of the measurable pigment particles have an aspect ratio of at least about 3:3:1, 3:4:1 or 4:4:1. In another embodiment, the pigment is provided in a size distribution wherein at least about 60% of the volume of the measurable pigment particles have an aspect ratio of at least about 3:3:1, 3:4:1 or 4:4:1. In an embodiment of the present invention, the pigment has a Median Particle Size as determined by Sedograph techniques of from 5 to about 20 microns.

In another embodiment of the present invention, the pigment size and aspect ratios are determined by Lamellarity index which is described in U.S. Pat. No. 6,348,536 B1, wherein at least about one half of the measurable pigment particles by volume have a Lamellarity index greater than 0.4. In another embodiment, at least about 60% of the measurable pigment particles by volume have a Lamellarity index greater than 0.4.

In a preferred embodiment, the primer comprises a mixture of pigment materials of platelet-shaped pigments and low aspect ratio pigments, wherein the pigment materials are a mixture of mica with talc and/or clay.

In a preferred embodiment the total pigment volume concentration of the water stain blocking primer is less than 40%, in a more preferred embodiment the total pigment volume concentration of the water stain blocking primer is less than 30%.

The water-borne stain blocking primer additionally comprises from about 0.05 to about 3 wt % of a tannin chelation agent based on total solids content of the primer. The weight of the tannin chelation agent is based on its dried weight. For purposes of the present invention, a tannin chelation agent is an agent that is chelated by tannin to form water insoluble precipitates.

Examples of such tannin chelation agents are compositions that provide metal ions such as ions of zirconium, zinc, aluminum, calcium and barium. Preferred tannin chelation agents include ammonium zirconium carbonate, sodium zirconium carbonate, and potassium zirconium carbonate. Further examples of tannin chelation agents include metal complexes such as ammonium metal-, sodium metal- or potassium metal- that are complexed with various anionic species, such as —$SO_4$, —$NO_3$, —Cl, borate or the mono-, poly- or oxy-carboxylic acids such as carbonic, acetic, formic, propionic, tartaric, citric, lactic, glycolic, or mandelic acids. Mixtures of the various different additional (inorganic and organic) anionic species are specifically contemplated.

A preferred tannin chelation agent is a zinc ammonium complex having the formula

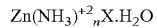

$Zn(NH_3)^{+2}{}_n X \cdot H_2O$ where n is a number from 4 to 6 and where X is selected from a group consisting of acetate, borate, carbonate, citrate and phosphate.

An example of an aluminate based complex chemical composition used to form an insoluble complex with tannins is described in U.S. Pat. No. 6,533,856. A preferred tannin chelation agent is ammonium zirconium carbonate provided in a stabilized form so that the chelation agent will stay in solution until applied to the intended substrate. Commercially available aqueous tannin stain inhibitive additives are available from Wayne Pigment Corporation under the trade name Stainban® Tannin Stain Inhibitive products.

Mixtures of one or more tannin chelation agents are specifically contemplated.

The primer of the present invention optionally additionally comprises an additional water-dispersible, hydrophobic, free-radically polymerized copolymer. The additional copolymer is compatible with the alkyd resin and preferably contributes to the film-forming properties of the system and additionally provides rheological benefits. The dispersible, hydrophobic free-radically polymerized copolymer preferably has a Tg of from about −20° C. to about 100° C., and more preferably from about 0° C. to about 30° C. Preferably, the water-dispersible, hydrophobic free-radically polymerized copolymer has an acid number below about 30; more preferably the hydrophobic free-radically polymerized copolymer has an acid number below 20.

The water-dispersible, hydrophobic free-radically polymerized copolymer preferably is present in an amount of from about 0 to about 20 wt % based on total solids content of the primer, and more preferably is present in an amount of from about 0 to about 15% based on total solids content of the primer. The water-dispersible, hydrophobic free-radically polymerized copolymer preferably is present in the coating composition as dispersed particles, having an average particle size of less than 150 nm, more preferably less than 120 nm, as determined by dynamic light scattering instruments such as the Brookhaven Instruments 90Plus Particle Size Analyzer.

During manufacture of the present primer, the hydrophobic free-radically polymerized copolymer preferably is provided in the form of an aqueous copolymer dispersion having a solids content of from about 35 to about 65 wt %, more preferably from about 40 to about 60 wt %.

The reactants used to form the water-dispersible, hydrophobic free-radically polymerized copolymer may be monomers, oligomers, and/or resins having free radically polymerizable functionality. Representative examples of free radically polymerizable functionality include (meth)acrylate groups, olefinic carbon-carbon double bonds, allyloxy groups, alpha-methyl styrene groups, styrene groups, (meth) acrylamide groups, cyanate ester groups, (meth)acrylonitrile groups, vinyl ether groups, combinations of these, and the like. The term "(meth)acryl", as used herein, encompasses acryl and/or methacryl unless otherwise expressly stated.

Preferred such water-dispersible, hydrophobic free-radically polymerized copolymers are prepared from one or more monomers selected from acrylates, methacrylates, vinyl acetates, vinyl versatates, alkenes (such as ethylene), vinyl aromatics (such as styrene), vinylidenes (such as vinylidene chloride), vinyl halides (such as vinyl chloride) and the like.

Examples of reactant monomers that may be used to form the water-dispersible, hydrophobic free-radically polymerized copolymer include vinyl esters, vinyl ethers, lactams such as N-vinyl-2-pyrrolidone, (meth)acrylamide, N-substituted (meth)acrylamide, octyl (meth)acrylate, nonylphenol ethoxylate (meth)acrylate, isononyl(meth)acrylate, 1,6-hexanediol (meth)acrylate, isobornyl(meth)acrylate, 2-(2-ethoxyethoxy)ethyl(meth)acrylate, 2-ethylhexyl (meth)acrylate, lauryl(meth)acrylate, beta-carboxyethyl(meth)acrylate, butyl(meth)acrylate; isobutyl(meth)acrylate, cycloaliphatic epoxide, alpha-epoxide, 2-hydroxyethyl(meth)acrylate, (meth)acrylonitrile, maleic anhydride, itaconic acid, isodecyl (meth)acrylate, dodecyl (meth)acrylate, n-butyl(meth)acrylate, methyl(meth)acrylate, hexyl(meth)acrylate, (meth) acrylic acid, N-vinylcaprolactam, stearyl(meth)acrylate, hydroxy functional caprolactone ester (meth)acrylate, octodecyl(meth)acrylate, isooctyl(meth)acrylate, hydroxyethyl (meth)acrylate, hydroxymethyl(meth)acrylate, hydroxypropyl(meth)acrylate, hydroxyisopropyl (meth)acrylate, hydroxybutyl(meth)acrylate, hydroxyisobutyl(meth)acrylate, tetrahydrofurfuryl(meth)acrylate, combinations of these, and the like.

In an embodiment, the water-dispersible, hydrophobic free-radically polymerized copolymer is an acrylate copolymer. In an embodiment, the water-dispersible, hydrophobic free-radically polymerized copolymer is a vinyl acetate-vinyl versatate copolymer.

In an embodiment, the water-dispersible, hydrophobic free-radically polymerized copolymer is a copolymer of styrene and acrylic monomers with preferably about 30% to 60% styrene and 40% to 70% acrylic monomer. Preferred acrylic monomers of this embodiment are esters of acrylic and methacrylic acid such as 2-ethyl hexyl acrylate, butyl acrylate, butyl methacrylate, lauryl acrylate, and methyl methacrylate. In an embodiment of the present invention, the copolymer dispersion comprises an acetoacetoxy functionality. In an embodiment of the present invention, the copolymer dispersion comprises a reactive carbonyl functionality such as provided by the use of diacetone acrylamide, as a component of the reactive monomers.

A primer comprising a mixture of water-dispersible, hydrophobic free-radically polymerized copolymers is specifically contemplated.

The primer of the present invention comprises a hydrophobically modified associative rheology modifier in an amount effective to provide a water-borne primer having an ICI viscosity of from about 0.5 to about 3 poise; and a KU viscosity range of from about 80 to about 120 Krebs units.

It has been found that rheology modifiers in general can have a deleterious effect on the stain blocking performance of primers, and therefore the present invention advantageously uses as small an amount as possible of hydrophobically modified associative rheology modifier to achieve the desired ICI rheology and KU viscosity measurements of the primer as a whole.

In an embodiment of the present invention, the amount of hydrophobically modified associative rheology modifier is present in an amount to achieve an ICI viscosity of from about 0.5 to about 2.5 poise, and a KU viscosity range of from about 80 to about 120 Krebs units, and also is present in an amount such that the stain blocking effect of the primer is sufficient to provide a delta E less than 1.5 in the household stain blocking test, and provide a delta E less than 3 in the tannin stain blocking test as defined below.

In another embodiment, the primer of the present invention comprises from about 0.1 to about 5 wt % of a hydrophobically modified associative rheology modifier. In another embodiment, the primer of the present invention comprises from about 0.1 to about 3 wt % or from about 0.1 to about 2 wt % of a hydrophobically modified associative rheology modifier.

The hydrophobically modified associative rheology modifier preferably is prepared from a water soluble polymer having a molecular weight of from about 4000 to about 12,000 that is then reacted to hydrophobically modify the polymer. In a preferred embodiment, the hydrophobically modified associative rheology modifier is made from a water soluble polymer based on polyethylene glycol. In another preferred embodiment, the hydrophobically modified associative rheology, modifier is made from a water soluble polymer based on polyacrylamide. The thus provided water soluble polymer is reacted with reactive hydrophobic reactants, such as isocyanate, melamine, acid anhydrides and the like to form, for example, urethanes and polyesters.

In a preferred embodiment of the present invention, the hydrophobically modified associative rheology modifier is prepared as the reaction product of a central component reactive with hydroxy functionality, which is reacted with polyethylene glycol ("PEG") components. The PEG components preferably have a molecular weight of from about 4000 to 12,000, and more preferably from about 7000 to about 9000. The reacted PEG precursor is then preferably endcapped with hydrophobic alcohol functionalities, such as a 4 carbon to 18 carbon alcohol, such as, for example hexyl alcohol, decyl alcohol, lauryl alcohol, or octadeca alcohol. In one embodiment, the hydrophobically modified associative rheology modifier has a total molecular weight of from about 20,000 to about 50,000. Too low a molecular weight is not as efficient as desired, and may lead to gelation of the composition. Too high a molecular weight may lead to phase separation and additionally adversely affects the stain blocking properties of the composition.

Examples of hydrophobically modified associative rheology modifiers include hydrophobically modified polyether-polyurethanes as described in U.S. Pat. Nos. 4,079,028, 4,155,892, 4,496,708, 4,426,485, 4,499,233, 5,023,309 and 5,281,654; hydrophobically modified polyether-polyurethanes bearing terminal hydrophilic groups as described in PCT International WO 96/40820; hydrophobically modified polyether-polyols as described in U.S. Pat. Nos. 4,288,639, 4,354,956, 4,904,466; hydrophobically modified polyacrylates U.S. Pat. Nos. 4,514,552, 4,421,902, 4,423,199, 4,429, 097, 4,663,385, 4,008,202, 4,384,096, and 5,342,883; hydrophobically modified polyacrylamide as described in U.S. Pat. Nos. 4,425,469, 4,432,881, 4,463,151, 4,463,152, and 4,722, 962; and hydrophobically modified aminoplast-polyethers as described in PCT International WO 96/40625 and WO 96/40185).

In a preferred embodiment of the present invention, the hydrophobically modified associative rheology modifier is a hydrophobically modified urethane rheology modifier.

The primer composition optionally comprises non-polymeric rheology modifiers to provide enhanced storage stability and/or sag resistance as desired. In an embodiment of the present invention, the primer composition contains up to 1% of a thixotropic clay More preferably the composition contains from 0.01% to 1% of a thixotropic clay. Examples of these materials are modified smectite, attapulgite or bentonite clays, such as Attagel® 50 clay and Bentone® LT clay.

Additionally, the water borne stain blocking primer optionally contains coalescing agents that are not VOCs. That is, a non-VOC coalescing agent is a coalescing agent which has a boiling point above 280° C. at atmospheric pressure. A coalescing agent is a compound that is added to a water borne stain blocking primer, which reduces the minimum film forming temperature (MFFT) of water borne stain blocking primer by at least 1° C. The MFFT is measured using ASTM test method D2354. Examples of coalescing agents that are not VOCs include plasticizers, low molecular weight polymers, surfactants, and autooxidizable plasticizers such as alkyl esters of unsaturated fatty acids.

Typical methods of paint or coating preparation introduce adventitious VOCs from the aqueous polymer composition containing the polymer particles having pendant crosslinking groups, biocides, defoamers, soaps, dispersants, and thickeners. These typically account for 0.1% VOC by weight based on the total weight of the aqueous polymer composition. Additional methods such as steam stripping and choice of low VOC containing additives like biocides, defoamers, soaps, dispersants, and thickeners are suitable for further reducing the aqueous polymer composition to less than 0.01% VOC by weight based on the total weight of the aqueous polymer composition.

Preferably, the water-borne stain blocking primer has a pH of at least about 7.

The water borne stain blocking primer preferably has a volume solids between 30% and 50%. More preferably the water borne stain blocking primer has a volume solids between 35% and 45%.

Optional additional components suitable for use in coating compositions may additionally be incorporated as will now be appreciated by the practitioner, such as colorants, extenders, stabilizers, biocides, fungicides, surfactants, dispersants, anti-foaming agents, freeze-thaw additives and the like.

The primer of the present invention is prepared by generally conventional coating composition manufacturing techniques.

In a preferred embodiment, all resin components of the primer composition are provided in the form of aqueous dispersions that are mixed together to provide the desired final quantities of solids and total water. In another embodiment, all components of the primer composition are provided in the form of aqueous dispersions that are mixed together to provide the desired final quantities of solids and total water. The aqueous dispersions are mixed using conventional coating composition manufacturing techniques, and additional water is added at any stage of the manufacturing process to provide the desired solids content of the ultimate primer formulation.

When all resin components are provided as aqueous dispersions, the order of mixing of the various ingredients is not critical. However, it has been found preferably the tannin chelation agent should be added late or last in the manufacturing process for reasons of manufacturing ease and stability of the overall system.

In use, the primer of the present invention may be applied to various substrates, preferably those substrates in need of blocking stain from visual perception after completion of all coating steps. Substrates to be coating including wood, metal, concrete, stucco, plastics, ceramic, plaster, glass, painted surfaces. In a preferred embodiment, the substrate to be coating contains high amounts of tannin, and more preferably, the substrate to be coated is a high tannin wood product. In another embodiment the primer may be applied to a previously painted substrate that has been stained with a water-soluble stain, such as water-soluble markers. In another embodiment the primer may be applied to a substrate stained with nicotine or cigarette smoke. In another embodiment the primer may be applied to water damaged or stained drywall or ceiling tiles. The structure to be coated may be indoor or outdoor applications, including siding. In an embodiment of the present invention the primer is applied to a weathered surface, and may be applied to a weathered surface that has a chalky appearance.

Because the primer of the present invention has a low VOC content, it may be applied in a contained space, such as indoors with less adverse affects to the odor of the indoor location or unpleasant affects on the personnel applying the primer or in the vicinity of the primer application. In an embodiment of the present invention, fewer air changes need to be conducted in the vicinity of the application of the present primer to the substrate as compared to solvent based systems or systems having higher VOC content.

EXAMPLES

Representative embodiments of the present invention will now be described with reference to the following examples that illustrate the principles and practice of the present invention.

The following examples are prepared using the standard paint-making process to contain the following ingredients.

Examples 1-3

|  | Example | | |
|---|---|---|---|
|  | 1 | 2 | 3 |
|  | % COMPOSITION | | |
| ALKYD EMULSION | 44 | 33 | 33 |
| STYRENE EMULSION | — | 11 | — |
| ACRYLIC EMULSION | — | — | 11 |

-continued

| | Example | | |
|---|---|---|---|
| | 1 | 2 | 3 |
| | % COMPOSITION | | |
| SMECTITE CLAY | 0.3 | 0.3 | 0.3 |
| HIGH-ASPECT RATIO TALC | | | |
| (Lamellarity index 0.70) | 14 | 14 | 14 |
| MICA | 2 | 2 | 2 |
| STAINBAN 185 | 1.2 | 1.2 | 1.2 |
| AMMONIUM HYDROXIDE | 0.1 | 0.1 | 0.1 |
| HEUR THICKENER 1 | 1.9 | 1.2 | 1.2 |
| HEUR THICKENER 2 | 1 | 0.5 | 0.5 |
| WATER | 20 | 20 | 20 |
| OTHER | 15.2 | 16.4 | 16.4 |
| DRIER | 0.3 | 0.3 | 0.3 |
| TOTAL | 100 | 100 | 100 |
| VOC g/L | 43 | 43 | 43 |
| KU | n/a | 112 | n/a |
| ICI (P) | n/a | 0.85 | n/a |

Examples 4 and 5

Comparative

| | Comparative Examples | | | |
|---|---|---|---|---|
| | 4 | 5 | 7 | 8 |
| | % COMPOSITION | | | |
| ALKYD EMULSION | 33 | — | n/a | n/a |
| STYRENE EMULSION | 11 | — | | |
| ACRYLIC EMULSION | — | 40 | | |
| HIGH-ASPECT RATIO TALC | — | — | | |
| (Lamellarity index 0.70) | | | | |
| MICA | 2 | — | | |
| NEPHELINE SYENITE | 14 | — | | |
| CLAY | | 13 | | |
| SILICA | | 6 | | |
| STAINBAN 185 | 1.2 | — | | |
| AMMONIUM HYDROXIDE | 0.1 | | | |
| OTHER THICKENER | — | 0.7 | | |
| HEUR THICKENER 1 | 1.2 | 2.4 | | |
| HEUR THICKENER 2 | 0.5 | 0.2 | | |
| WATER | 20 | 20 | | |
| OTHER | 16.7 | 17.7 | | |
| DRIER | 0.3 | — | | |
| TOTAL | 100 | 100 | n/a | n/a |
| VOC g/L | 43 | 47 | n/a | n/a |
| KU | n/a | n/a | 98 | 100 |
| ICI (P) | n/a | n/a | 1.0 | 1.0 |

Example 6

Comparative—Test Primer described in Example 5 of U.S. Pat. No. 6,113,989

| WATER | 207 |
|---|---|
| RCL-535 | 150 |
| FILLER PIGMENT GAMMASPERS | 116.0 |
| ETHYLENE GLYCOL | 19.5 |
| TEXANOL | 5 |
| SURFYNOL 104 | 2.0 |
| ACRYSOL QR-708 | 5.5 |
| NATROSOL 250 MHR | 0.5 |

-continued

| TAMOL 681 | 12 |
|---|---|
| FOAMASTER VL | 1.2 |
| SKANE-8 | 2.0 |
| AMMONIA | 1.0 |
| MAINCOATE MV-23LO | 520 |
| STAIN INHIBITOR | 26.0 |
| TOTAL (PARTS) | 1067.7 |

The alkyd emulsion to be used in the above examples has an initial acid value of 15.2 which increased to 17.0 after 30 days, at a temperature of 130° F., which is a 1.8 acid number unit increase or an 11.8% increase.

Example 7

Comparative

A commercially available primer sample was obtained. The Product label indicated that the primer comprised an alkyd resin, the VOC max is 25 g/L, the measured KU is 98, and the measured ICI is 1.0.

Example 8

Comparative

A commercially available primer sample was obtained. The Product label did not indicate the identity of the resin, but indicated that the max VOC was 100 g/L, the measured KU is 100, and the measured ICI is 1.0.

Description of Test Methods

ICI Test Methodology

As discussed above, the ICI viscosity is the viscosity, expressed in units of poise, measured on a high shear rate, cone and plate viscometer known as an ICI viscometer. Measurements are made as described in ASTM D4287.

Measurements are made using spindle #2 at 9,000 rpm, at a temperature of 25+/−0.3° C.

KU Test Methodology

As discussed above, the KU viscosity is the viscosity, expressed in Krebs units, measured on a Stormer-type viscometer in accordance with ASTM D562-10. The KU viscosity is measured at 25° C.+/−0.2° C.

Acid Number Test

The Acid Number of the alkyd resin or the water-dispersible, hydrophobic free-radically polymerized copolymer is determined by ASTM Test Method D974-08

Tannin Blocking Evaluation Method:

The primers of the above examples and comparative primers are applied at a spread rate of 400 square feet per gallon to 4' redwood boards and allowed to dry overnight. Next, they are topcoated with a commercial semi-gloss exterior white paint with a contrast ratio of at least 0.97 when measured with a 100 micron draw down. The top coat is allowed to dry overnight. The 4' redwood boards are then placed on a Cleveland Humidity Cabinet for one week and are evaluated for color change.

Color change is evaluated by first measuring the color of a 4 mil drawdown on a Leneta opacity card of the commercial semi-gloss white paint with a minimum contrast ratio of 0.97. Next the color is measured in triplicate of the top-coated primer sample and a delta E is calculated. A delta E of less than 3 is considered a pass.

Stain Blocking Evaluation Method:

A drywall board is first primed with a commercial interior flat white paint and allowed to dry overnight. A two inch band of Crayola® Tropical Violet Permanent marker is applied to the primed drywall. The primer is then applied to the stained drywall at a thickness of 75 microns perpendicular to the stain and allowed to dry overnight. A commercial semi-gloss white paint with a minimum contrast ratio of 0.97 is then applied over the primed, stained drywall and allowed to dry overnight. Color change is evaluated by first measuring the color in triplicate of the 75 micron topcoat over the primed neat drywall and averaging the values. Next, the color is measured, again in triplicate and averaged, of the topcoated primer sample and a delta E is calculated. A delta E of less than 1.5 is considered a pass.

Example 2 and Comparative Examples 7 and 8 were evaluated for stain blocking and tannin blocking, with results as follows:

|  | Example | Comparative Examples | |
|---|---|---|---|
|  | 2 | 7 | 8 |
| Tannin Blocking (Δ E) | 2.5 | 1.8 | 13.7 |
| Household Stain Blocking (Δ E) | 0.6 | 2.3 | 3.7 |

Example 2 was tested in comparison to current commercial offerings. Example 2 did pass both tests, however Comparative Example 7 failed the household stain blocking test and Comparative Example 8 failed the tannin blocking test.

Based on experience in testing a number of similarly formulated primer compositions, Examples 1 and 3 are expected to pass both the tannin and household stain blocking tests and Comparative Examples 4, 5 and 6 are expected to fail the household stain test; whereas, 5 is expected to fail the tannin test.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A water-borne stain blocking primer comprising
   a) from about 10 to about 30 wt % based on total solids content of the primer of a water-dispersible, hydrophobic alkyd resin having an acid number of less than 40 KOH/g;
   b) from about 5 to about 30 wt % of a platelet-shaped pigment based on total solids content of the primer, the platelet-shaped pigment having an average aspect ratio of at least about 3:3:1;
   c) from about 0.05 to about 3 wt % of a tannin chelation agent based on total solids content of the primer;
   d) from about 0 to about 20 wt % of a water-dispersible, hydrophobic free-radically polymerized copolymer;
   e) a hydrophobically modified associative rheology modifier in an amount effective to provide a water-borne primer having an ICI viscosity of from about 0.5 to about 3.0 poise; and a KU viscosity range of from about 80 to about 120 Krebs units; and
   f) water;
   wherein the water-borne primer has a VOC content of less than 5 wt %.

2. The water-borne stain blocking primer of claim 1, wherein the alkyd resin is hydrophobic alkyd resin having an acid number of less than 20 KOH/g.

3. The water-borne stain blocking primer of claim 1, wherein the alkyd resin is present as from about 13 to about 25 wt % based on total solids content of the primer.

4. The water-borne stain blocking primer of claim 1, wherein the alkyd resin comprises a drying alkyd resin.

5. The water-borne stain blocking primer of claim 4, wherein the primer additionally comprises metal driers to effect cure of the system when coated on the intended substrate.

6. The water-borne stain blocking primer of claim 1, wherein the alkyd resin exhibits a change in acid number of no more than 10 acid units after 30 days at 130° F.

7. The water-borne stain blocking primer of claim 1 wherein the platelet-shaped pigment has a Lamellarity index of at least 0.4.

8. The water-borne stain blocking primer of claim 1, wherein all pigments in the primer are provided in a size distribution wherein more than half of the volume of the measurable pigment particles have an aspect ratio higher than 3:3:1.

9. The water-borne stain blocking primer of claim 1, wherein at least one of the platelet-shaped pigment is a talc pigment.

10. The water-borne stain blocking primer of claim 1, wherein the platelet-shaped pigment is a mixture of talc, clay, and/or mica pigments.

11. The water-borne stain blocking primer of claim 1, wherein the tannin chelation agent is a composition that comprises a metal ion selected from zirconium, zinc, aluminum, calcium and barium.

12. The water-borne stain blocking primer of claim 1, wherein water-dispersible, hydrophobic free-radically polymerized copolymer has a Tg of from about 0° C. to about 30° C.

13. The water-borne stain blocking primer of claim 1, wherein water-dispersible, hydrophobic free-radically polymerized copolymer is present in the coating composition as dispersed particles having an average particle size of less than 150 nm.

14. The water-borne stain blocking primer of claim 1, wherein the hydrophobically modified associative rheology modifier is present in an amount to achieve an ICI viscosity of from about 0.5 to about 2.5 poise, and a KU viscosity range of from about 80 to about 120 Krebs units, and also is present in an amount such that the stain blocking effect of the primer is sufficient to provide a delta E less than 1.5 in the household stain blocking test, and provide a delta E less than 3 in the tannin stain blocking test.

15. The water-borne stain blocking primer of claim 1, wherein the hydrophobically modified associative rheology modifier is present in an amount from about 0.1 to about 5 wt % based on total solids content of the primer.

16. The water-borne stain blocking primer of claim 1, wherein the hydrophobically modified associative rheology modifier has a total molecular weight of from about 20,000 to about 50,000.

17. The water-borne stain blocking primer of claim 1, additionally comprising a non-polymeric rheology modifier.

18. The water-borne stain blocking primer of claim 1, wherein the primer is formulated to have a VOC content of less than 2%.

19. A method of making a water-borne stain blocking primer comprising mixing:
   a) from about 10 to about 30 wt % based on total solids content of the primer of a water-dispersible, hydrophobic alkyd resin having an acid number of less than 40 KOH/g;
   b) from about 5 to about 30 wt % of a platelet-shaped pigment based on total solids content of the primer, the platelet-shaped pigment having an average aspect ratio of at least about 3:3:1;
   c) from about 0.05 to about 3 wt % of a tannin chelation agent based on total solids content of the primer;
   d) from about 0 to about 20 wt % of a water-dispersible, hydrophobic free-radically polymerized copolymer;
   e) a hydrophobically modified associative rheology modifier in an amount effective to provide a water-borne primer having an ICI viscosity of from about 0.5 to about 3.0 poise; and a KU viscosity range of from about 80 to about 120 Krebs units; and
   f) water;
to form a water-borne primer that has a VOC content of less than 5 wt %.

20. A method of using a water-borne stain blocking primer comprising a primer of the formula:
   a) from about 10 to about 30 wt % based on total solids content of the primer of a water-dispersible, hydrophobic alkyd resin having an acid number of less than 40 KOH/g;
   b) from about 5 to about 30 wt % of a platelet-shaped pigment based on total solids content of the primer, the platelet-shaped pigment having an average aspect ratio of at least about 3:3:1;
   c) from about 0.05 to about 3 wt % of a tannin chelation agent based on total solids content of the primer;
   d) from about 0 to about 20 wt % of a water-dispersible, hydrophobic free-radically polymerized copolymer;
   e) a hydrophobically modified associative rheology modifier in an amount effective to provide a water-borne primer having an ICI viscosity of from about 0.5 to about 3.0 poise; and a KU viscosity range of from about 80 to about 120 Krebs units; and
   f) water;
   wherein the water-borne primer has a VOC content of less than 5 wt %; and
B. applying the primer to a substrate.

\* \* \* \* \*